Patented Feb. 27, 1945

2,370,253

UNITED STATES PATENT OFFICE 2,370,253

ARYLENE THIAZYL SULPHENAMIDES

William E. Messer, Cheshire, Conn., assignor to United States Rubber Company, New York, N. Y., a corporation of New Jersey No Drawing. Original applications June 24, 1939, Serial No. 280,929, and May 10, 1940, Serial No. 334,343. Divided and this application September 18, 1942, Serial No. 458,860

3 Claims. (Cl. 260—306.6)

This invention relates to a new class of compounds which have been found valuable as accelerators for the vulcanization of rubber.

This case is a division of my copending applications Serial No. 280,929, filed June 24, 1939, Patent 2,321,305, and Serial No. 334,343, filed May 10, 1940, Patent 2,321,306.

The new class of chemicals may be represented by the general formula

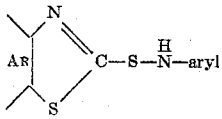

where AR is an arylene group.

The materials are derivatives of arylene-thiazyl sulphur chloride, wherein the chlorine is replaced by the

radical above, when one mole of the arylene-thiazyl sulphur chloride is reacted with one mole of a primary arylamine, such as aniline, naphthylamine, alpha naphthylamine, beta naphthylamine, etc. During such reaction hydrogen chloride is eliminated.

In the following illustrative example, benzothiazyl sulphur chloride is used as the reagent; it may be prepared in solution, for purposes of reaction by passing dry chlorine into a slurry of 1,1' dithio bis benzothiazole in benzene, carbon tetrachloride, etc.

The materials are delayed-action accelerators similar in this respect to 1,1' dithio bis benzothiazole itself. They may be used alone or in conjunction with basic nitrogen compounds such as ammonia, amines, guanidines such as diphenyl guanidine, thiuram sulphides such as tetramethyl thiuram monosulphide, etc., which have the action of activating the accelerating ability of thiazole accelerators. They may also, if desired, be used in admixture with other thiazole accelerators such as the mercapto-benzothiazyl sulphides.

The following example is given to illustrate the invention in which comparison is made with a stock containing 1,1' dithio bis benzothiazole (parts are by weight):

EXAMPLE

The reaction product of benzothiazyl sulphur chloride and aniline (N-phenyl benzothiazyl sulphenamide).

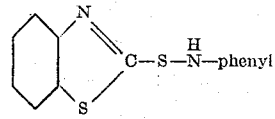

A 66 grams crude 1,1' dithio bis benzothiazole are stirred with 300 to 600 cc. carbon tetrachloride and dry chlorine passed in until complete solution ensues and about 14.1 grams of chlorine has been absorbed. About 70 ccs. of aniline are then added with stirring and after standing a short while the resulting solution is filtered and the precipitate washed with a little carbon tetrachloride, recovering some 47 grams pure aniline hydrochloride (aniline salt). The carbon tetrachloride filtrates are evaporated to dryness (condensing and recovering carbon tetrachloride used) leaving 105 grams of dark gray, oily crystals. These may be purified by washing with alcohol and drying, thereby obtaining 60 grams of light gray colored crystals, melting at 119–122° C.

B 66 grams of pure 1,1' dithio bis benzothiazole (made by recrystallizing the product used in A from benzene) are treated in the same way as in A. 52.7 grams pure aniline salt are recovered. 97.5 grams of crude N-phenyl benzothiazyl sulphenamide of melting point 114–118° C. are obtained and this will yield 75.3 grams N-phenyl benzothiazyl sulphenamide melting point 118–120° C. on purification.

The following rubber mixes were made, vulcanized and tested.

|  | Stock | |
| --- | --- | --- |
|  | A | B |
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acids | 1 | 1 |
| Sulphur | 3 | 3 |
| 1,1' dithio bis benzothiazole | 0.65 |  |
| N-phenyl benzothiazyl sulfenamide |  | 0.65 |

Tensiles—Unaged

| Minutes cure at 30 lbs./sq. in steam pressure | A | | B | |
|---|---|---|---|---|
| | T | E | T | E |
| 10 | 60 | 953 | 300 | 843 |
| 20 | 400 | 513 | 460 | 666 |
| 30 | 1,860 | 546 | 1,160 | 573 |
| 40 | 2,080 | 626 | 1,860 | 563 |
| 50 | 2,280 | 596 | 2,160 | 636 |

Scorch test

| Minutes cure at 5 lbs./sq. in steam pressure | A | | B | |
|---|---|---|---|---|
| | T | E | T | E |
| 45 | 132 | 1,330 | 225 | 1,437 |
| 60 | 130 | 1,515 | 200 | 1,280 |
| 75 | 137 | 1,445 | 203 | 1,243 |
| 90 | 155 | 1,337 | 210 | 1,197 |
| 120 | 192 | 1,050 | 215 | 1,107 |
| 150 | 305 | 652 | 247 | 852 |
| 180 | 855 | 577 | 275 | 810 |

T=Ultimate tensiles in pounds per square inch.
E=% elongation at break.

The term "rubber" herein is to be understood as including caoutchouc and similar vulcanizable gums, natural or synthetic, including latices thereof.

Other ratios of the compounding ingredients than those mentioned in the example as well as other well known fillers, pigments and the like may be employed in the production of various types of rubber compounds as will be apparent to those skilled in the art to which this invention pertains.

Having thus described my invention, what I claim and desire to protect by Letters Patent is:

1. A compound having the general formula

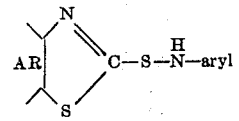

where AR is an arylene hydrocarbon group.

2. A N-monoaryl monobenzothiazyl sulphenamide having the general formula

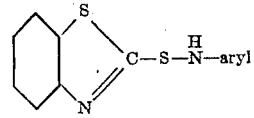

3. A compound having the general formula

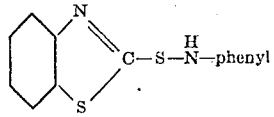

WILLIAM E. MESSER.